3,033,841
VINYL ACETATE-POLYOXYALKYLENE COMPOUND COPOLYMERS AND METHOD OF PREPARATION
Leo M. Germain, Shawinigan Falls, Quebec, Canada, assignor to Shawinigan Chemicals Limited, Montreal, Quebec, Canada, a corporation of Canada
No Drawing. Filed Jan. 3, 1958, Ser. No. 706,901
7 Claims. (Cl. 260—89.1)

This invention relates to new products prepared by polymerizing vinyl acetate with polyoxyalkylene derivatives and to the processes for preparing them.

The invention consists in a process for the preparation of a copolymer of vinyl acetate and a polyoxyalkylene compound comprising (a) mixing monomeric vinyl acetate and the polyoxyalkylene compound, in proportions by weight ranging from 10:1 to 1:10, with benzoyl peroxide in an amount ranging from 0.1% to 16% by weight on the vinyl acetate, and (b) subjecting the mixture to polymerizing temperatures in the range from 60° C. to reflux temperature of the polymerizing mixture. The invention further consists in a process for the preparation of a hydrolyzed copolymer of vinyl acetate and a polyoxyalkylene compound comprising preparing said copolymer of vinyl acetate and polyoxyalkylene compound as described above, dissolving the copolymer in an alcohol of the group consisting of methanol and ethanol, mixing with the resultant solution an alkaline alcoholysis catalyst for polyvinyl acetate, and subsequently recovering the resultant hydrolyzed product. The invention further consists in the copolymers of vinyl acetate and polyoxyalkylene compounds and in the hydrolyzed copolymers of vinyl acetate and polyoxyalkylene compounds.

Those products of this invention which are soluble in water possess useful emulsifying properties, and can be used in the preparation of resin emulsions which form water-insensitive films. Certain of these products possess a permanent tackiness, so that they are useful as pressure-sensitive adhesives. Those products which are insoluble in water can be converted to water-soluble products by hydrolysis of the acetate groups to alcohol groups, to form new products with useful properties, for example, as adhesives, emulsifiers, or grease-proof coatings.

Various polyoxyalkylene compounds can be used in the process of the invention, for example, those derived from ethylene glycol, propylene glycol, or butylene glycols. Their molecular weight may range from that of the tetramer up to very high values such as 20,000. These polymers normally are diols, with hydroxy groups on each end of the polymer chain; but for use in this invention, one such hydroxy group may be replaced by a lower alkoxy group, or it may be esterified by a saturated aliphatic carboxylic acid.

The polyethylene glycol used in the examples was "Carbowax," the registered trademark for some of such glycols. A number (e.g. 20M) following the trademark indicates the approximate average molecular weight of the particular polyglycol. Polyethylene glycols ranging in molecular weight from 200 to 20,000 can be used in this invention, as likewise can polypropylene and polybutylene glycols with corresponding numbers of monomeric glycol units in each molecule; all may have a terminal hydroxy group replaced as noted above.

The benzoyl peroxide catalyst for the reaction is preferably dissolved in the monomeric vinyl acetate. The polymerization can be carried out by the slow addition of the monomer-catalyst solution to the polyoxyalkylene compounds at temperatures in the range from 60° C. up to reflux.

Alternatively, a portion of the monomer-catalyst solution up to about one quarter can be added at once and the remainder slowly. In this variation of the process the catalyst can be dissolved in all the monomer or in only that part of it which is added initially to the polyoxyalkylene compounds. Agitation during polymerization should be adequate to ensure the mixing of the refluxed monomer into the reaction mixture.

The product of the polymerization is not merely a mechanical mixture of polyvinyl acetate and the polyoxyalkylene compound but rather a copolymer. Some of the products of the invention are soluble in water, either hot or cold or either, a property not possessed by polyvinyl acetate, nor conferred on it by dissolving it in hot "Carbowax 4000" and heating it for four hours. If a solution of polyvinyl acetate in "Carbowax 4000" so prepared is treated with water it coagulates to a mass from which the "Carbowax" can be extracted with water, leaving polyvinyl acetate contaminated only by traces of "Carbowax."

The surface tensions of aqueous solutions of the water-soluble products are distinctly different from those of water and of aqueous solutions of the corresponding pure polyoxyalkylene compound. Further, the interfacial tension between a heavy mineral oil and aqueous solutions of the water-soluble products are distinctly lower than those between the mineral oil and water or aqueous solutions of the pure polyoxyalkylene compounds. Thus at 30° C. the surface tension of water is about 72 dynes/cm. and that of a 0.1% aqueous solution of "Carbowax 4000" is about 65 dynes/cm., whereas those of 0.1% aqueous solutions of the copolymer products of vinyl acetate and "Carbowax 4000," containing between 50% and 75% vinyl acetate, are between 47 and 52 dynes/cm. The interfacial tension between a certain heavy mineral oil and water at 30° C. is about 36 dynes/sq. cm., and that between the oil and 0.1% aqueous solution of "Carbowax 4000" is about 30 dynes/sq. cm. whereas the interfacial tension between the oil and 0.1% aqueous solutions of the copolymer products of vinyl acetate and "Carbowax 4000," containing between 50% and 75% vinyl acetate, are between 15 and 16 dynes/sq. cm. These distinct differences between the properties of the products of this invention and the properties of the water soluble component of mechanical mixtures of polyoxyalkylene compounds and polyvinyl acetate illustrate the surprising and valuable nature of the products.

The acetate groups may be split off the vinyl acetate portions of the products of this invention by the use of the alkaline alcoholysis catalysts which are well known in the art. The reaction is of most interest as applied to those products which are originally water-insoluble, because the products of the alcoholysis treatment are water-soluble and have a wider range of usefulness.

All temperatures throughout this specification and claims are expressed in degrees centigrade.

*Example 1*

The reaction vessel was a one-liter glass flask having three necks fitted with a reflux condenser with thermometer, a slow-speed stirrer with seal, and a separatory funnel with stopcock to permit delayed addition of monomer, respectively. The body of the flask was immersed in a water bath. The reactants were:

| | Grams |
|---|---|
| "Carbowax 600" | 300 |
| Vinyl acetate | 150 |
| Benzoyl peroxide [1] | 24.2 |

[1] Dissolved in the vinyl acetate.

The "Carbowax" was heated in the flask to 75°. One-quarter of the vinyl acetate was added to the flask; the remainder was added slowly at a rate which maintained a slow reflux (75° to 80°) and required about 2¼ hours.

When the addition of monomer was completed, the temperature of the charge was raised slowly to about 98°. The product was a clear liquid, soluble in water at 20°, amounting to 460 grams.

Optionally, instead of adding one-quarter of the monomer at the beginning, all of the vinyl acetate could have been added by "delayed addition." It is undesirable to add more than one-quarter of the monomer at the beginning, because the exothermic reaction would be difficult to control.

Example 2

This was carried out in a two-liter flask fitted as in Example 1. The reactants were:

| | Grams |
|---|---|
| "Carbowax 4000" | 500 |
| Vinyl acetate | 500 |
| Benzoyl peroxide [1] | 2.5 |

[1] Dissolved in the vinyl acetate.

The "Carbowax" was heated in the flask to 75°. The whole of the vinyl acetate was added slowly ("delayed addition") to the molten "Carbowax" over a period of 3½ hours while the reacting mixture was held at its reflux temperature. The temperature was then raised to 90° and held for ½ hour to reduce residual monomer. The crude product was a solid having about the consistency of beeswax at room temperature and a clear viscous liquid at 100°, amounting to 993 grams.

One hundred grams of the crude product was extracted with boiling water in a modified Soxhlet extractor for 72 hours. The fraction soluble in boiling water amounted to about 75 grams.

The crude product of Example 2 was used as a sole emulsifying agent in making by known methods (a) a stable emulsion of polymethyl methacrylate which had fine particle size (average less than 0.2 micron) and yielded films with excellent water-spotting resistance, (b) a stable emulsion of polyethyl acrylate which yielded films with fair water-spotting resistance, (c) a stable emulsion of polystyrene.

An emulsion of polyvinyl acetate, 55% solids by weight, was prepared by known methods using 0.36% of an alkyl aryl sodium sulphonate as surface-active agent and 3.5% of the hot-water soluble fraction of Example 2 (both based by weight on the total charge). This emulsion had excellent mechanical and storage stability, and had no graininess; dried films of the emulsion were smooth and clear, with excellent water-spotting resistance.

Example 3

One hundred grams of "Carbowax 20M" (i.e. 20,000) were melted in a covered W and P-type blade mixer with reflux condenser by heating to 65°. Twenty-five grams of vinyl acetate containing 0.25 gram of benzoyl peroxide were added by delayed addition at reflux during the period of about 2¼ hours. Then the temperature was raised to about 95°. The reaction product was a white homogeneous rubbery mass at room temperature and was completely soluble in cold or hot water.

Example 4

Following the procedure of Example 1, 300 grams of "Carbowax 6000" were placed in the reactor and 300 grams of vinyl acetate containing 3 grams benzoyl peroxide were added, one-quarter at the beginning, and the remainder by delayed addition.

The product was dissolved in acetone and applied to kraft paper as a coating which was dried at 50° C. After exposure of the paper at room temperature for eight months, the tackiness of the coating was unchanged, indicating its usefulness as a pressure-sensitive adhesive.

Example 5

Pluronic F-68, an oxyethylene-oxypropylene block copolymer containing 80–90 molecular percent ethylene oxide, and with a molecular weight in the range 1501 to 1800, 150 grams; vinyl acetate, 300 grams; and benzoyl peroxide, 2.8 grams; were reacted by the procedure of Example 1. The product was a solid having the consistency of uncrystallized honey at room temperature, and a clear viscous liquid at 100°.

Example 6

Fifty grams of "Carbowax 20M," one hundred grams of vinyl acetate, and one gram of benzoyl peroxide were reacted in the apparatus and by the procedure of Example 3. The product, amounting to 149 grams, was a milk-white water-insoluble solid when cold. It was dissolved in 300 grams of ethanol. Into this was stirred at room temperature (about 22°) 60 ml. of a solution of caustic soda in methanol (25 g.p.l.). On standing overnight the mobile solution had become a soft gel. It was cut into small portions and dried at about 65°. The final product was completely water-soluble. Analysis by saponification in water (as used for analysis of hydrolyzed polyvinyl acetate) showed less than 2% residual polyvinyl acetate.

To confirm that the product is a copolymer of polyethylene glycol and polyvinyl alcohol, rather than a mixture of them, a sample of the final product was extracted overnight with toluene in a Soxhlet extractor. Toluene is a solvent for polyethylene glycol and would have extracted the polyglycol if it were free and not part of a copolymer. The product after extraction was submitted to examination by infrared spectroscopy; it showed characteristic peaks for both the ether linkage of the polyglycol and the hydroxy group of the polyvinyl alcohol, confirming the presence of both a polyglycol portion and a polyvinyl alcohol portion in the extracted product.

It is obvious that many variations may be made in the products and processes of this invention without departing from the spirit and scope thereof as defined in the following claims.

What is claimed is:

1. A process for the preparation of a copolymer of vinyl acetate and a polyoxyalkylene compound having at least four oxyalkylene units in its structure and being selected from the group consisting of polyoxyalkylene glycols, the lower alkyl monoethers of said polyoxyalkylene glycols, and the monoesters of said polyoxyalkylene glycols with saturated aliphatic carboxylic acids, comprising (a) forming a mixture consisting of monomeric vinyl acetate and the polyoxyalkylene compound, in proportions by weight ranging from 10:1 to 1:10, and benzoyl peroxide in an amount ranging from 0.1% to 16% by weight of the vinyl acetate, and (b) subjecting the mixture to polymerizing temperatures in the range from 60° C. to the reflux temperature of the polymerizing mixture.

2. A process as claimed in claim 1, in which the polyoxyalkylene compound is a polyethylene glycol.

3. A process as claimed in claim 2, in which the proportions by weight of vinyl acetate to polyethylene glycol are between 2:1 and 1:4.

4. A process as claimed in claim 3, in which the benzoyl peroxide is between 0.5% and 5% by weight of the vinyl acetate.

5. A process as claimed in claim 4 in which the mixture is polymerized at the refluxing temperature of the mixture.

6. A process for preparing a hydrolyzed derivative of a copolymer of vinyl acetate and a polyoxyalkylene compound having at least four oxyalkylene units in its structure and being selected from the group consisting of polyoxyalkylene glycols, the lower alkyl monoethers of said polyoxyalkylene glycols, and the monoesters of said polyoxyalkylene glycols with saturated aliphatic carboxylic acids, comprising (a) preparing a copolymer by the process claimed in claim 1, (b) dissolving the copolymer in an alcohol selected from the group consisting of methanol and ethanol, (c) mixing with the resultant solution an alkaline alcoholysis catalyst for polyvinyl acetate, and (d) subsequently recovering the resultant hydrolyzed derivative.

7. A hydrolyzed derivative of a copolymer of vinyl acetate and a polyoxyalkylene compound having at least four oxyalkylene units in its structure and being selected from the group consisting of polyoxyalkylene glycols, the lower alkyl monoethers of said polyoxyalkylene glycols, and the monoesters of said polyoxyalkylene glycols with saturated aliphatic carboxylic acids, said copolymer having been prepared by the process claimed in claim 6.

References Cited in the file of this patent

UNITED STATES PATENTS

| 2,211,266 | Gibello | Aug. 13, 1940 |
| 2,559,628 | Joyce | July 10, 1951 |
| 2,682,532 | Adelman | June 29, 1954 |

FOREIGN PATENTS

| 499,577 | Canada | Jan. 26, 1954 |
| 364,323 | Great Britain | Jan. 7, 1932 |